United States Patent
Gao et al.

(10) Patent No.: US 9,940,198 B2
(45) Date of Patent: Apr. 10, 2018

(54) OPTIMIZATION OF REBUILDING IN SOLID STATE DRIVES

(71) Applicant: International Business Machines Corporation, Armonk, NY (US)

(72) Inventors: Xue Dong Gao, Shanghai (CN); Brian A. Rinaldi, Tucson, AZ (US); Qian Su, Shanghai (CN); You Wei, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/457,925

(22) Filed: Mar. 13, 2017

(65) Prior Publication Data

US 2017/0185484 A1    Jun. 29, 2017

Related U.S. Application Data

(63) Continuation of application No. 14/503,298, filed on Sep. 30, 2014.

(51) Int. Cl.
| | | |
|---|---|---|
| *G06F 11/00* | (2006.01) | |
| *G06F 11/10* | (2006.01) | |
| *G06F 11/20* | (2006.01) | |
| *G06F 12/02* | (2006.01) | |

(52) U.S. Cl.
CPC ........ *G06F 11/1092* (2013.01); *G06F 11/108* (2013.01); *G06F 11/1072* (2013.01); *G06F 11/2058* (2013.01); *G06F 12/0253* (2013.01); *G06F 2201/84* (2013.01); *G06F 2212/7205* (2013.01)

(58) Field of Classification Search
CPC ............. G06F 11/1092; G06F 11/1072; G06F 11/108; G06F 11/2058
See application file for complete search history.

(56) References Cited

U.S. PATENT DOCUMENTS

| | | |
|---|---|---|
| 8,255,617 B2 | 8/2012 | Goss et al. |
| 8,392,622 B2 | 3/2013 | Mosek et al. |
| 8,452,911 B2 | 5/2013 | Gorobets et al. |
| 8,473,669 B2 | 6/2013 | Sinclair |
| 8,621,138 B2 | 12/2013 | Olbrich et al. |
| 9,658,923 B2 | 5/2017 | Gao et al. |
| 2006/0085433 A1 | 4/2006 | Bacon et al. |
| 2012/0310998 A1 | 12/2012 | Burka et al. |

(Continued)

OTHER PUBLICATIONS

List of IBM Patents or Patent Applications Treated As Related.
(Continued)

*Primary Examiner* — Bryce Bonzo
*Assistant Examiner* — Katherine Lin
(74) *Attorney, Agent, or Firm* — Zilka-Kotab, P.C.

(57) ABSTRACT

A data processing apparatus-implemented method, according to one embodiment, includes selecting blocks of data in at least one solid state drive for garbage collection in a garbage collection process, and creating a bitmap indicating which blocks of data are in the garbage collection process. The bitmap has a two bit structure for each of the blocks, where the two bit structure includes a unique pair of bits associated with a logical block address (LBA) of the individual one of the blocks associated with the two bit structure. One bit indicates whether the block is in the garbage collection process. The other bit indicates whether rebuilding of the block has been completed.

17 Claims, 7 Drawing Sheets

(56) References Cited

U.S. PATENT DOCUMENTS

2014/0258587 A1 9/2014 Baryudin et al.
2016/0092309 A1 3/2016 Gao et al.

OTHER PUBLICATIONS

Gao et al., U.S. Appl. No. 14/503,298, filed Sep. 30, 2014.
Choudhuri et al., "Real-Time Access Guarantees for NAND Flash Using Partial Block Cleaning," IFIP International Federation for Information Processing, 2008, pp. 138-149.
Qin et al., "Real-Time Flash Translation Layer for NAND Flash Memory Storage Systems," Real-Time and Embedded Technology and Applications Symposium (RTAS), 2012 IEEE 18th, 2012, pp. 1-10.
Non-Final Office Action from U.S. Appl. No. 14/503,298, dated May 20, 2016.
Violin Memory, "Running Federal IT at the Speed of Memory," White Paper, Jan. 2013, pp. 1-12.
Mehling, H., "Solid State Drives take Out the Garbage," Enterprise Storage Forum, Dec. 1, 2009, pp. 1-5.
OCZ Technology Group, "SSDs—Write Amplification, TRIM and GC," OCZ Technology. OCZenterprise, Nov. 2012, pp. 1-3.
Notice of Allowance from U.S. Appl. No. 14/503,298, dated Jan. 19, 2017.

OPTIMIZATION OF REBUILDING IN SOLID STATE DRIVES

BACKGROUND

The present invention relates to solid state drives, and more specifically, this invention relates to optimizing the rebuilding of solid state drives.

One distinction between Hard Disk Drives (HDDs) and Solid State Drives (SSDs) is implementation of a Flash Translation Layer (FTL), which is responsible for maintaining a mapping between physical/logical pages, balancing wear leveling, monitoring read count to prevent read disturbances, as well as garbage collection. Reading Logical Block Addresses (LBAs) that are undergoing garbage collection could cause a drop in parallelism, which may affect the performance.

BRIEF SUMMARY

In one embodiment, a computer program product includes a computer readable storage medium having program instructions embodied therewith, the program instructions readable and/or executable by a data processing apparatus to cause the data processing apparatus to perform a method comprising initiating, by the data processing apparatus, a rebuild process in a storage system comprising at least one solid state drive. A determination is made, by the data processing apparatus, which blocks of data are in a garbage collection process. The method further includes accessing, by the data processing apparatus, the blocks of data that are not in the garbage collection process and not accessing, by the data processing apparatus, the blocks of data that are in the garbage collection process. The rebuild process is performed using the blocks of data that are not in the garbage collection process. After a period of time, a reevaluation is made of the blocks that were determined to be in the garbage collection process to determine whether the garbage collection process is finished with the blocks not accessed. Later, in response to determining that the garbage collection process is finished with the blocks not accessed, the rebuild process continues using the blocks not accessed when said blocks not accessed are no longer in the garbage collection process.

A data processing apparatus-implemented method, according to one embodiment, includes selecting blocks of data in at least one solid state drive for garbage collection in a garbage collection process, and creating a bitmap indicating which blocks of data are in the garbage collection process. The bitmap has a two bit structure for each of the blocks, where the two bit structure includes a unique pair of bits associated with a logical block address (LBA) of the individual one of the blocks associated with the two bit structure. One bit indicates whether the block is in the garbage collection process. The other bit indicates whether rebuilding of the block has been completed.

A computer program product, according to another embodiment, includes a computer readable storage medium having program instructions embodied therewith, the program instructions readable and/or executable by a data processing apparatus to cause the data processing apparatus to perform a method comprising performing, by the data processing apparatus, a rebuild process using a bitmap indicating which blocks of data are not in a garbage collection process. The blocks that are both: (a) indicated in the bitmap as not being in the garbage collection process and (b) indicated as not having been rebuilt, are selected first for the rebuild process.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for boosting the rebuilding performance in SSD arrays. Various embodiments prevent the upper layer from reading the blocks that are under garbage collection. The drive FTL reports the LBAs in the current garbage collection queue to an upper layer. With this knowledge, the LBAs under garbage collection can be avoided, and other LBAs rebuilt first. Unlike spinning disks, SSD systems do not have a performance gain over sequential read/write. Therefore, there is little or no drawback in adopting any of the following non-sequential rebuilding methods.

In one general embodiment, a method includes initiating a rebuild process in a storage system comprising at least one solid state drive, obtaining a bitmap indicating which blocks of data are in a garbage collection process, determining which blocks of data are in the garbage collection process using the bitmap, accessing the blocks of data that are not in the garbage collection process, not accessing the blocks of data that are in the garbage collection process, and performing the rebuild process using the blocks of data that are not in the garbage collection process.

In another general embodiment, a computer program product comprises a computer readable storage medium having program instructions embodied therewith. The program instructions are readable and/or executable by a controller to perform a method comprising: selecting, by the controller, blocks of data in at least one solid state drive for garbage collection in a garbage collection process, creating, by the controller, a bitmap indicating which blocks of data are in the garbage collection process, selecting, by the controller, additional blocks of data for the garbage collection process, updating, by the controller, the bitmap when additional blocks of data are selected for the garbage collection process, and updating, by the controller, the bitmap when blocks of data are no longer in the garbage collection process.

In another general embodiment, a system includes a processor and logic integrated with and/or executable by the processor, the logic being configured to: select blocks of data in at least one solid state drive for garbage collection in a garbage collection process, create a bitmap indicating which blocks of data are in the garbage collection process, select additional blocks of data for the garbage collection process, update the bitmap when additional blocks of data are selected for the garbage collection process, and update the bitmap when blocks of data no longer in the garbage collection process.

Figure 1:
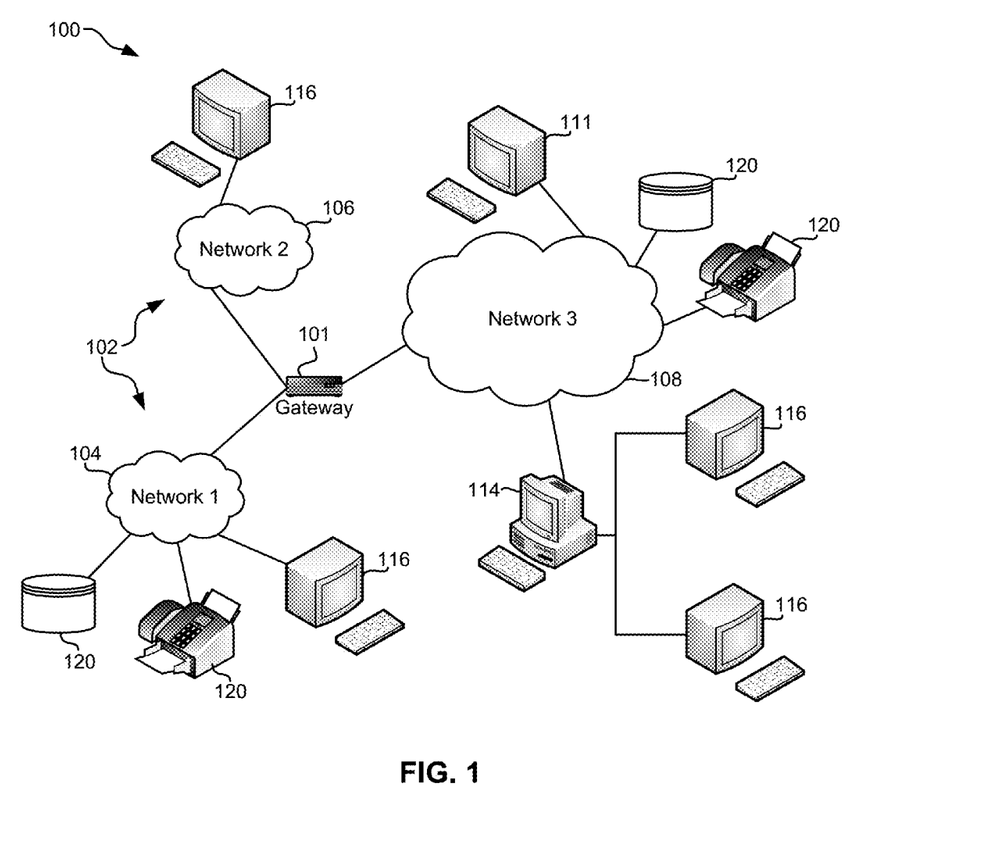
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
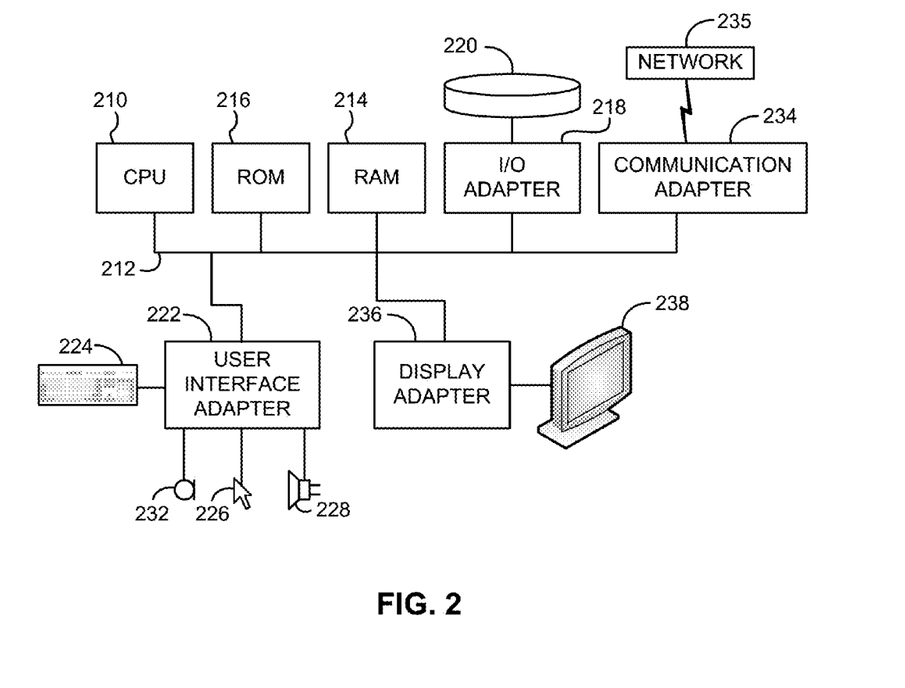
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
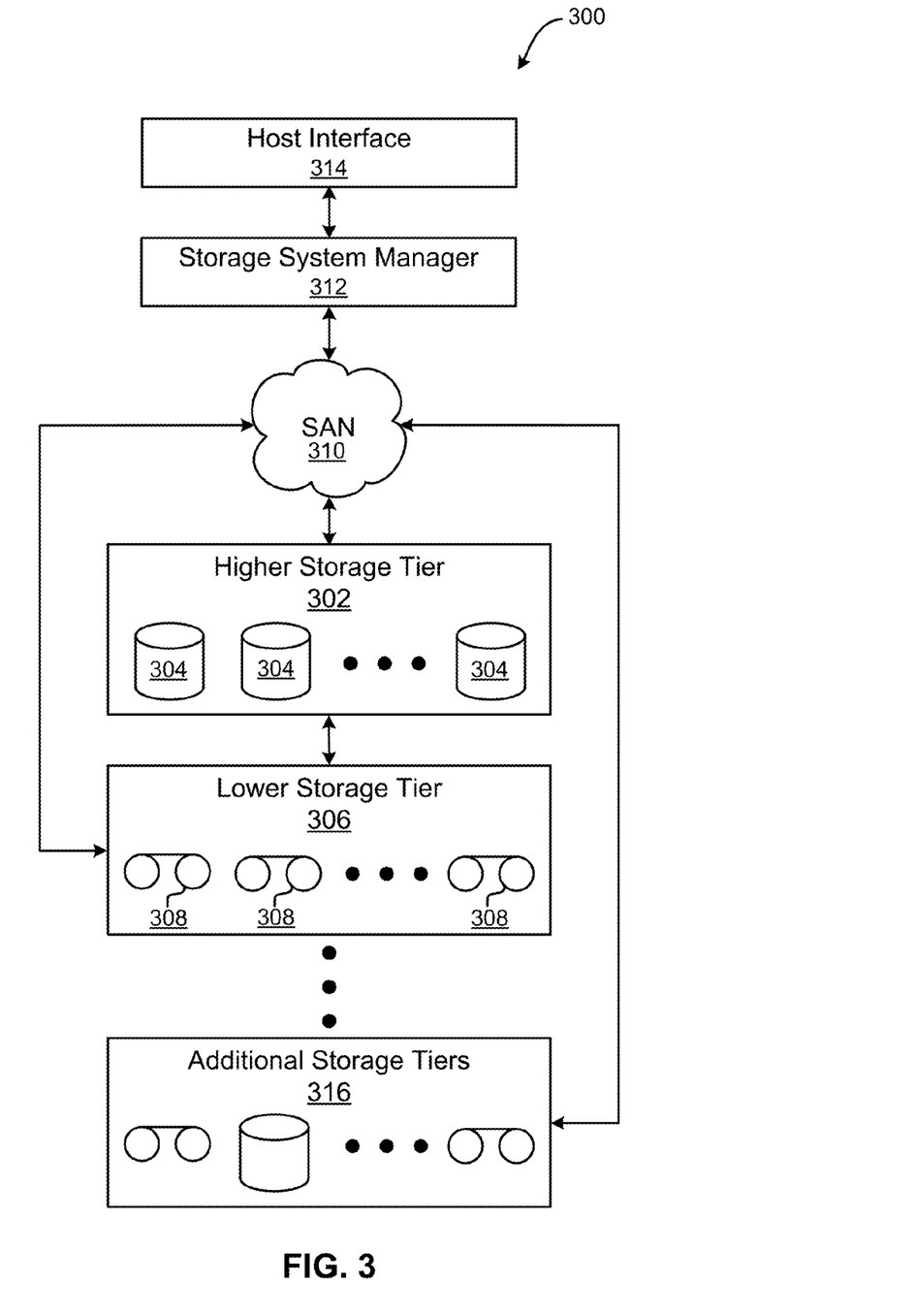
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

SSD technology typically conducts some level of garbage collection which includes reading and rewriting data to a flash memory. Garbage collection in the context of Flash SSD controllers, according to one embodiment, refers to the process of identifying blocks of data (or block-stripes depending on the specific controller and the respective garbage controller unit of operation) to be reclaimed for future usage, and relocating all pages that are still valid therein. The unit of garbage collection operations may be described as a logical erase block (LEB). Note that a LEB may be any multiple of a physical flash block, which is the unit of physical erasure.

Many drives differ in when and how fast they perform the process. Garbage collection requests are placed into a queue in order to be scheduled for service and are performed once the garbage collection process has been triggered. Garbage collection reduces the performance of a system, as during garbage collection, the I/O bandwidth and system response time in a SSD cannot be guaranteed. Furthermore, during a rebuilding process, garbage collection undesirably increases a system rebuild time, reduces system robustness, increases write amplification of a SSD, etc.

One example of how garbage collection would undesirably impact the rebuilding of a SSD occurs in an approach where a read while write rebuilding is occurring at two separate locations on a SSD. In such an approach, the read channels being used in a simultaneous garbage collection process may interrupt and/or block the requests of the read while write rebuilding process, and therefore undesirably negatively impact the rebuilding process.

As noted above, a key difference between HDDs and SSDs is that SSDs have a FTL, while HDDs do not. The FTL of a SSD is responsible for e.g. maintaining a mapping between physical/logical pages, balancing wear leveling, monitoring read counts to prevent read disturbances, garbage collection, etc. As described above, garbage collection has heretofore reduced the performance of a system, and thus in a SSD, reading LBAs that are in garbage collection could cause a drop in parallelism and performance of a SSD.

Various embodiments described herein determine which LBAs are in garbage collection, and not accessing these LBAs during rebuilding, in order to increase the rebuilding performance of a SSD.

Figure 4:
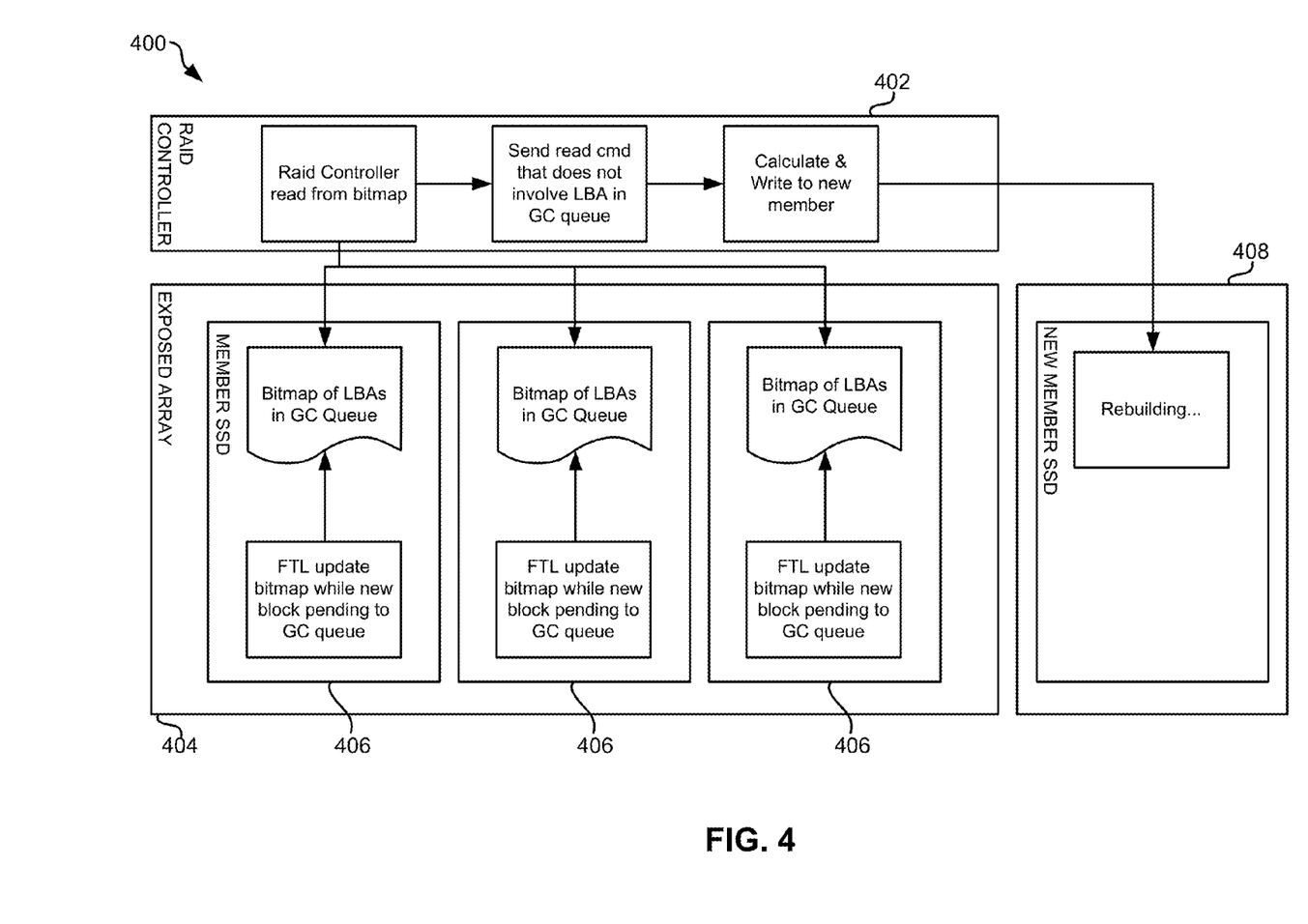
FIG. 4 illustrates an overview of a solid state drive rebuilding architecture, in accordance with one embodiment.

FIG. 4 includes a system overview 400 of a SSD during rebuilding, in which blocks of data that are undergoing garbage collection and/or are in a garbage collection queue are at least temporarily excluded from access. As illustrated in FIG. 4, drives 406 of an array 404 update a bitmap to indicate which of their LBAs are actively performing garbage collection, as will be described in greater detail below. Additionally the array contains a FTL, which is responsible for determining which blocks of data may be collected for data collection.

Based on a reading of this bitmap (which will be described in greater detail below), a RAID controller 402 issues a read command that does not include LBAs that are under garbage collection, which may include such LBAs being in a queue for garbage collection. Based on the read command of blocks not under garbage collection, the RAID controller 402 calculates and recovers data that was not recovered from error correction, and writes the recovered data to a new member SSD 408. In another approach, the controller 402 may issue a write command on a new member SSD when a portion or all of the data of an existing drive is no longer needed, is damaged beyond repair, etc. In such an approach, the unwanted data, damaged data, etc. may be deleted in garbage collection, and the remaining (useful) data may be rewritten to a new member SSD. A method of performing rebuilding process of FIG. 4 will be described below, according to one embodiment.

Figure 5:
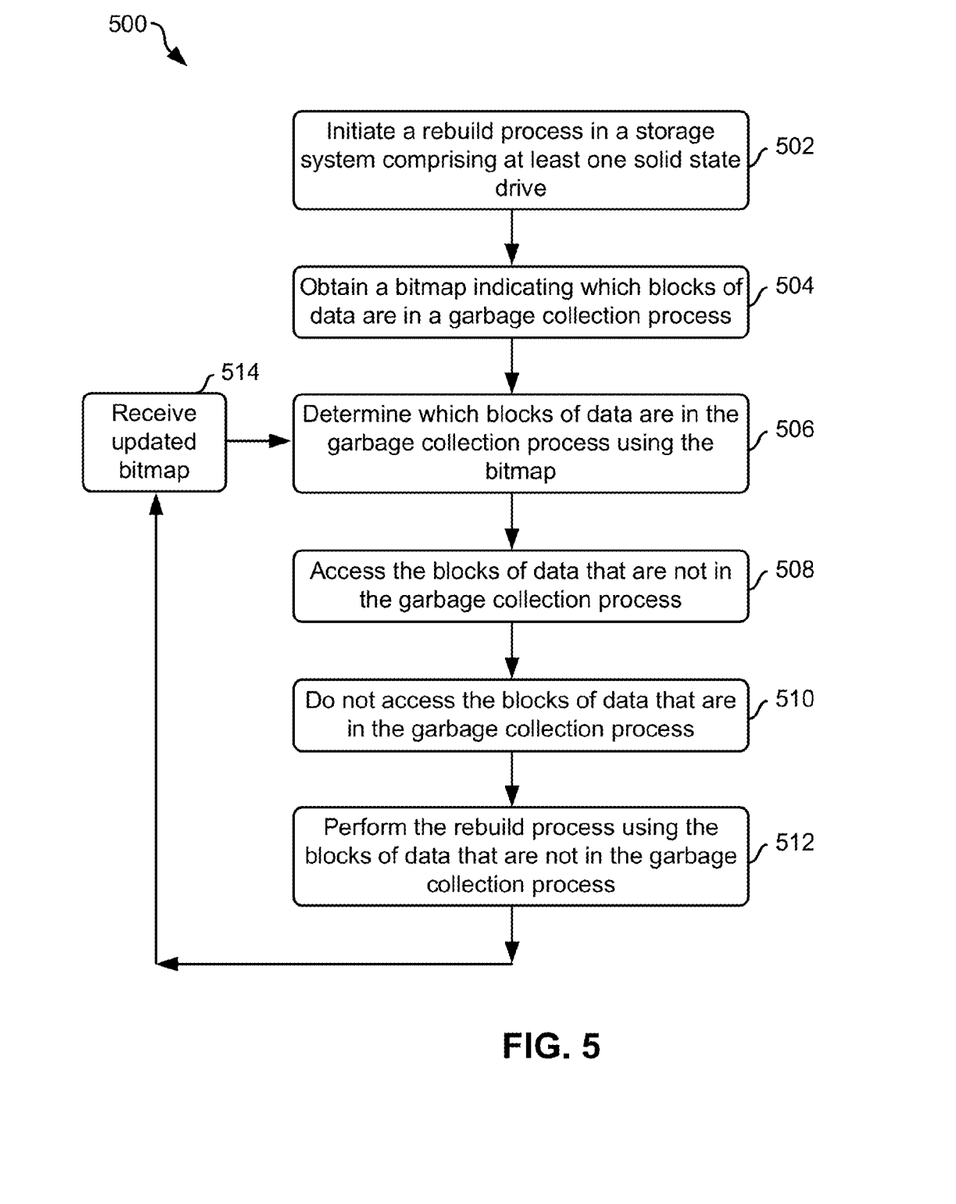
FIG. 5 illustrates a method, in accordance with one embodiment.

Now referring to FIG. 5, a flowchart of a method 500 is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. The controller, e.g., processing circuit(s), chip(s), and/or module(s) implemented in hardware and/or software, and preferably having at least one hardware component may be utilized in any device to perform one or more steps of the method 500. Illustrative controllers include, but are not limited to, a central processing unit (CPU), an application specific integrated circuit (ASIC), a field programmable gate array (FPGA), etc., combinations thereof, or any other suitable computing device known in the art.

In order to increase the rebuilding performance of SSDs, and further recover data that was not recovered during error correction, according to one approach, a controller initiates a rebuild process in a storage system comprising at least one solid state drive, as noted in operation 502. The controller may be a storage controller, such as the RAID controller 402 of FIG. 4, in a storage system. Typically, multiple drives will be present, but the teachings herein could apply to rebuilding a partition on a single drive.

Method 500 according to one approach further includes obtaining a bitmap indicating which blocks of data are in a garbage collection process as noted in operation 504. Again, blocks may be considered to be in a garbage collection process when actively being accessed, as well as, in some approaches, when in a garbage collection queue. A bitmap can be any data structure known in the art. In one approach, the bitmap may list a status of every block. In another approach, the bitmap may list only those blocks that are presently in data collection. Equivalently, the bitmap may list only those blocks that are not presently in data collection. The content of bitmaps may vary depending on the embodiment.

Using the bitmap, as noted in operation 506, the LBAs of blocks of data that are in the garbage collection process are determined, and excluded from the rebuilding process. As described above, excluding the blocks of data that are in a garbage collection process in the rebuilding of a SSD improves the rebuilding performance of a SSD e.g. in the time domain, in avoiding overcrowding a processor, etc.

In order to further distinguish the status of a block, e.g. to determine if a block should or should not be included in a rebuild process, in some embodiments, the bitmap may include a two bit structure for each of the LBAs of the blocks, where one bit indicates whether the block associated with the corresponding LBA is in the garbage collection process, and the other bit indicates whether rebuilding of the block has been completed. See Table 1.

TABLE 1

| | |
|---|---|
| 00 → | Not in garbage collection, not rebuilt yet |
| 01 → | Not in garbage collection, rebuilding done |
| 10 → | In garbage collection, not rebuilt yet |
| 11 → | In garbage collection, rebuilding done |

In the exemplary embodiment of Table 1, a '1' denotes yes, that the process has finished, that the process has been completed, etc., while a '0' indicates no, that the process has not finished, that the process has not been completed, etc. For example, a '01' may indicate that the block corresponding to the LBA in the bitmap is not in a garbage collection process and that its rebuilding is done. Based on this description of a '01' bit structure, the first bit position (right-most position in binary), here a '1' indicates that rebuilding of the block has been completed. Furthermore, based on the above description of a '01' bit structure the second bit position i.e. '0', indicates that the block is in the garbage collection process. Arrangements and bit representations of the above bit structures and bit indicators may vary depending on the embodiment. Moreover, any number of bits may be used in various approaches. For example, the bit structure may be associated with the LBAs in a table format. In other approaches, bits of each LBA itself may be modified to have a bit structure denotation.

In order to maintain the bitmap, a LBA may be initially assigned a '00' bit structure, signifying that the block corresponding to the LBA is not in garbage collection, and the rebuilding process has not been initiated. When a block is added to the garbage collection queue, the first bit of the LBA is changed to a '1' in the bitmap to indicate that the block corresponding to the LBA is in garbage collection. In the present approach, the first bit represents whether or not the block is in garbage collection, and the second bit indicates whether or not the rebuilding has been completed or not. Bit configurations may vary depending on the approach.

Additionally in the present approach, when the rebuilding of the block is completed, the second bit of the corresponding LBA will be marked as a '1' in the bitmap. Using the bitmap configurations described herein, blocks that are not in garbage collection and have not yet been built, i.e. '00' may be first selected for rebuilding as will be described below by operation 512.

Therefore according to one approach, the blocks of data that are not in the garbage collection process are accessed, as noted in operation 508. These are typically the blocks of data for which rebuilding has not been completed, e.g., denoted "00" in the bitmap. Similarly, in operation 510, according to one approach, the blocks of data that are in the garbage collection process are not accessed. Accessing the blocks of data that are not in the garbage collection process allows for task(s) pertaining to the blocks that are in the garbage collection process to finish, after which such blocks may be selected for rebuilding, as will be described in greater detail below, depending on the embodiment. This procedure alleviates the aforementioned problem that, in a SSD, reading blocks that are in garbage collection could cause a drop in parallelism and performance of a SSD.

Based on the above bit indicator descriptions, if a LBA is marked with a bit representation of '10' or '11', the corresponding block is in garbage collection and therefore will not be accessed for reading during a rebuilding process. Once garbage collection on a block is complete, its LBA is assigned the bit representation '01'. The '0' in the second bit position indicates that the block is not in garbage collection, and the '1' in the first bit position indicates that the block rebuilding is done.

Using the blocks of data that are not in the garbage collection process, a rebuilding process is performed as noted in operation 512. According to one approach, the blocks indicated as not being in the garbage collection process and the blocks indicated as not having been rebuilt are selected first for the rebuild process. Furthermore, said blocks may be determined to be in, or determined to not be in garbage collection using the LBA bit structure indicators described above. Selecting the blocks indicated as not being in the garbage collection process and the blocks indicated as not having been rebuilt first for a rebuilding process in a SSD will desirably decrease rebuilding time, increase system robustness, decreases write amplification on the SSD, etc., as previously noted.

During the rebuilding process, the bitmap may be updated to reflect a more current state of the status of each block. See operation 514.

According to one approach, the rebuild is within a single array of solid state drives (SSDs) e.g. operating like or as a Redundant Array of Independent Disks (RAID). According to a further approach, the rebuild is performed on a mirrored system, as will be described in FIG. 6. The rebuild of SSDs may vary depending on various embodiments.

Figure 6:
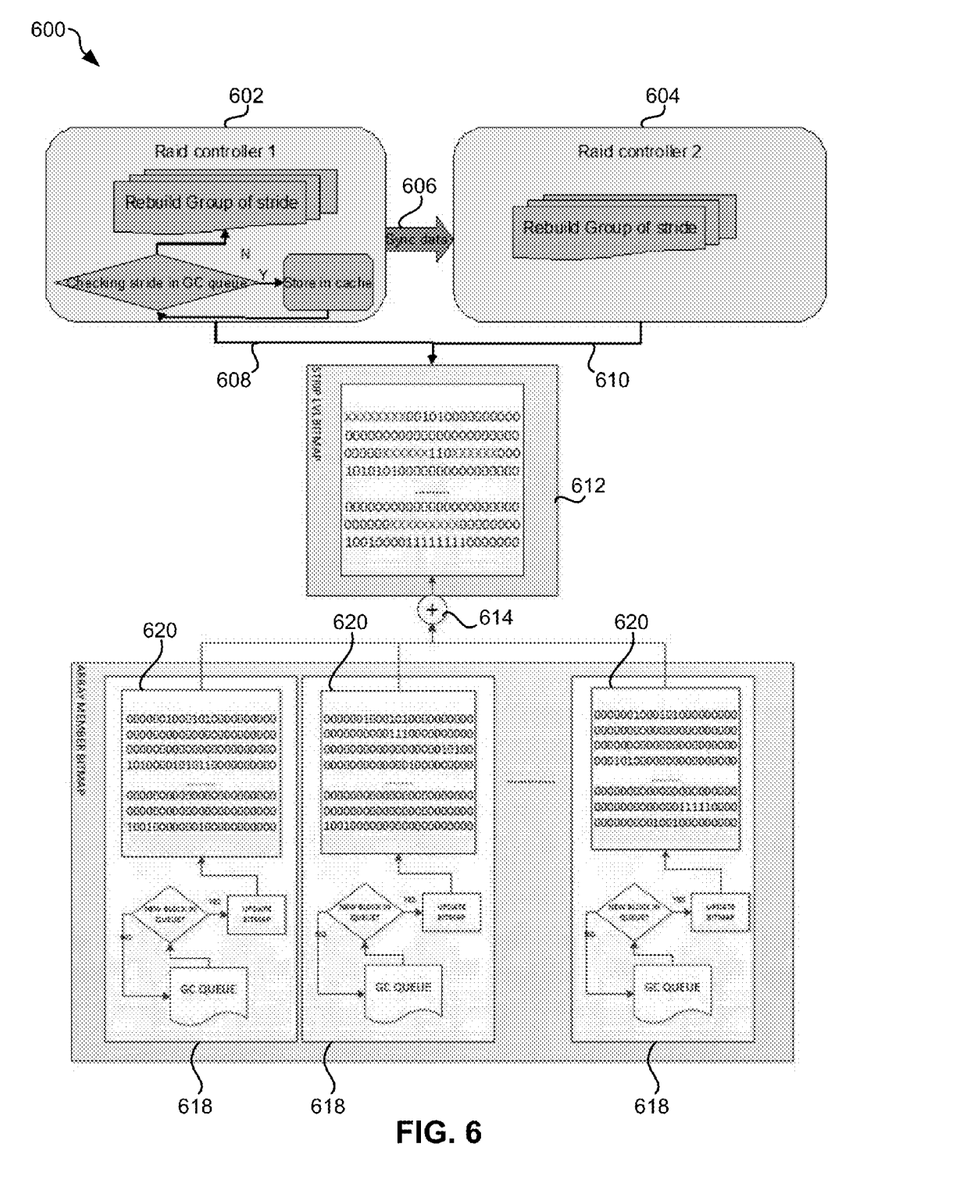
FIG. 6 illustrates a high level system overview, in accordance with one embodiment.

A high level overview of a system 600 of optimized rebuilding is illustrated in FIG. 6, in accordance with one embodiment. As an option, the present system 600 may be implemented in conjunction with features from any other embodiment listed herein, such as those described with reference to the other FIGS. Of course, however, such system 600 and others presented herein may be used in various applications and/or in permutations which may or may not be specifically described in the illustrative embodiments listed herein. Further, the system overview 600 presented herein may be used in any desired environment. Thus FIG. 6 (and the other FIGS.) should be deemed to include any and all possible permutations.

It should be noted that any one or more of the operations performed in the high level system overview may be implemented using a computer readable storage medium having program instructions embodied therewith. For example, program instructions may be readable and/or executable by a device, e.g. computer, processor, switch, router, processing circuit, etc. to cause the device to perform any one or more of the operations described below pertaining to FIG. 6.

Referring now to FIG. 6, according to one approach each solid state drive 618 performs an operation which includes selecting blocks of data for garbage collection and placing indicators, e.g., LBAs, of such blocks in a garbage collection queue. Typically, multiple drives will be present e.g. drives 618, but as previously mentioned, the teachings herein could apply to rebuilding a partition on a single drive.

Additionally, according to one approach each drive performs an operation which includes creating a bitmap 620, (which as described above can equivalently be any data structure), indicating which blocks of data are in the garbage collection process. In one approach, the bitmap lists the status of every block. In another approach, the bitmap lists only those blocks that are presently in data collection. Equivalently, the bitmap lists only those blocks that are not presently in data collection. Creating a bitmap 620, corresponding to the status of garbage collection of each drive according to one approach will be described below. Each of the drives 618 may create a personal drive level bitmap 620, which may be combined 614 into a strip level bitmap 612, e.g. to provide the controller with the status of drive's garbage collection, as depicted in the system overview of FIG. 6.

As shown in drives 618, as blocks of data in the solid state drives are selected for garbage collection in a garbage collection process, the LBAs of the blocks of data are added to a garbage collection queue.

In order to keep the bitmap continually updated, the logic of drives 618 is further configured to continually check for added LBAs in the garbage collection queue. When a new LBA is in the queue, the drive level bitmap 620 is updated with the LBA, as denoted by the "YES" logic. When the logic detects no new LBAs in the garbage collection queue, as denoted by the "NO" (no new block in queue), the process returns to the garbage collection queue to again check for updates, in order to keep the bitmap continually updated.

In preferred embodiments, the controller of each drive 618 selects blocks of data for garbage collection in a garbage collection process. In other embodiments, the Raid controller 602 may select data blocks for garbage collection and/or update the bitmap 620, e.g., based on information received from each drive when blocks of data are no longer in the garbage collection process.

The operations of RAID controller 602 may be used to create a strip level bitmap 612 that may be used in a rebuilding process.

According to one approach, RAID controller 602 may perform an operation which includes initiating a rebuilding process. The rebuilding process may be performed on various embodiments of data e.g. a stride (as shown in FIG. 6), data that has experienced losses, data in need of rearranging, data losses due to broken drive(s), etc. Data may be stored on the SSD drives in an array such drives according to strides. A stride of an array defines a quantity of bytes which must be traversed to get from one data element in the array to a successive (next or previous) data element in the array. The data element may be any number of bits, bytes, etc., but may not be larger than the size of the stride.

As previously mentioned, using the bitmap, the controller 602 may perform an operation which includes determining which blocks of data are in the garbage collection process, e.g., using the bitmap 612. In a dual RAID environment, the secondary RAID controller may receive the rebuilding bitmap from the control RAID controller and then perform corresponding work. As previously described, blocks of data that are in the garbage collection process undesirably increase the rebuilding time of a SSD, reduces system robustness of a SSD, increases write amplification on the SSD, etc.

Thus, according to one approach blocks of data that are not in the garbage collection process are accessed in rebuilding. These blocks of data may be synchronized 606 to an additional controller e.g. for rebuilding data in parallel (602, 604 of FIG. 6), rebuilding data in a mirrored system, rebuilding data in a parity system, rebuilding data in a priority system, etc. The RAID controller 602 may further perform an operation which includes performing the rebuild process using the blocks of data that are not in the garbage collection process.

Furthermore, blocks of data that are in the garbage collection process are not accessed in rebuilding. An indicator of the blocks not accessed by the rebuilding process, e.g. blocks that were determined to be preforming garbage collection, etc. may be stored e.g. in a RAID controller database, so that they may finish garbage collection, and later continue the rebuilding process when the said blocks are no longer in the garbage collection process.

As shown in the logic of RAID controller 602, when checking a stride and then determining that a block of data is in a garbage collection queue, e.g. noted as a 'Y' or yes, the block of data or its LBA may be stored in a cache and then reevaluated again after any period of time to see if the garbage collection process is finished with the block of data. When the garbage collection process is finished with the block, e.g. noted as a 'N' or no, signifying that the block of data is no longer in garbage collection, the block of data may be added to stride rebuilding, synced 604 with an additional controller, etc.

The workflow of rebuilding an array will now be described below in the description of FIG. 7.

Figure 7:
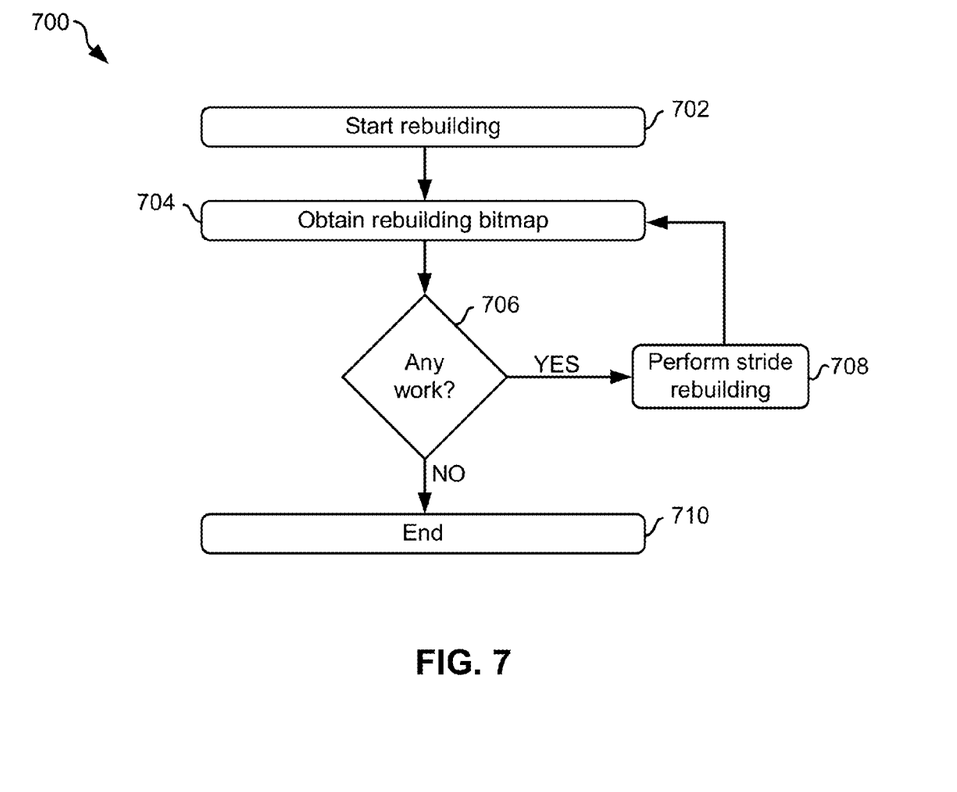
FIG. 7 illustrates an array rebuilding workflow, in accordance with one embodiment.

FIG. 7 illustrates an array rebuilding workflow 700, according to one embodiment. The workflow of rebuilding an array begins when as noted in operation 702 the rebuild is initiated e.g. by a controller, by a RAID controller, by a trigger, etc. According to one approach, as noted in operation 704, once the rebuild has started, a rebuilding bitmap is obtained, e.g., from each drive, as a stripe level bitmap, etc. As described above, the rebuilding bitmap indicates which blocks of data are in a garbage collection process. Once again, blocks of data that are in a garbage collection process are selectively excluded from the rebuilding process in order to improve rebuilding performance on SSDs. Note that such excluded blocks may be later re-assessed and, if the data block is no longer in garbage collection, it may be accessed for a rebuilding process.

According to workflow 700, a controller performs determination 706 to determine if any work needs to be done on blocks denoted in the obtained bitmap e.g. rebuilding due to damage, reorganizing of arrays due to lost data, etc.

If a controller determines that work is needed on blocks, as noted by the "YES" logic in FIG. 7, the controller may perform operation 708 in which stride rebuilding is conducted. Once stride rebuilding is conducted, the rebuilding bitmap is updated. After the rebuilding bitmap is updated, operation 704, and subsequent logic is again performed, as shown by the logic of workflow 700.

If a controller determines that work is not needed on blocks of the obtained bitmap, as noted by the "NO" logic in FIG. 7, the controller may end the rebuilding workflow.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product, the computer program product comprising a computer readable storage medium having program instructions embodied therewith, the program instructions readable and/or executable by a data processing apparatus to cause the data processing apparatus to perform a method comprising:
    initiating, by the data processing apparatus, a rebuild process in a storage system comprising at least one solid state drive;
    determining, by the data processing apparatus, which blocks of data are in a garbage collection process;
    accessing, by the data processing apparatus, the blocks of data that are not in the garbage collection process;
    not accessing, by the data processing apparatus, the blocks of data that are in the garbage collection process;
    performing, by the data processing apparatus, the rebuild process using the blocks of data that are not in the garbage collection process;
    reevaluating, by the data processing apparatus after a period of time, the blocks that were determined to be in the garbage collection process to determine whether the garbage collection process is finished with the blocks not accessed; and
    later, in response to determining that the garbage collection process is finished with the blocks not accessed, continuing the rebuild process, by the data processing apparatus, using the blocks not accessed when said blocks not accessed are no longer in the garbage collection process,
    wherein the rebuild is within a single array of solid state drives, wherein the blocks of data that are not in the garbage collection process are synchronized between at least two controllers for rebuilding the data.

2. The computer program product as recited in claim 1, wherein the program instructions are readable and/or executable by the data processing apparatus to cause the data processing apparatus to store an indicator of the blocks not accessed, wherein the indicator is stored in a RAID controller database;
    wherein a bitmap indicates which blocks of data are in the garbage collection process,
    wherein the bitmap is updated at least once during the rebuild process, wherein the updating reflects a more current state of a status of each block,
    wherein the reevaluating includes reading the updated bitmap,
    wherein the blocks of data that are not in the garbage collection process are synchronized between at least two controllers for rebuilding the data,
    wherein the bitmap is a rebuilding bitmap received from a control RAID controller by a secondary RAID controller,
    wherein the received rebuilding bitmap is used to perform the rebuild process.

3. The computer program product as recited in claim 1, wherein a bitmap indicates which blocks of data are in the garbage collection process, wherein a bitmap indicates which blocks of data are in the garbage collection process, wherein the bitmap has a two bit structure for each of the blocks, wherein the two bit structure includes a unique pair of bits associated with a logical block address (LBA) of the individual one of the blocks associated with the two bit structure,
    wherein one bit indicates whether the block is in the garbage collection process, wherein the other bit indicates whether rebuilding of the block has been completed.

4. The computer program product as recited in claim 3, wherein the blocks indicated as not being in the garbage collection process and the blocks indicated as not having been rebuilt are selected first for the rebuild process.

5. A data processing apparatus-implemented method, comprising:
    selecting blocks of data in at least one solid state drive for garbage collection in a garbage collection process; and creating a bitmap indicating which blocks of data are in the garbage collection process,
wherein the bitmap has a two bit structure for each of the blocks,
wherein the two bit structure includes a unique pair of bits associated with a logical block address (LBA) of the individual one of the blocks associated with the two bit structure,
wherein one bit indicates whether the block is in the garbage collection process,
wherein the other bit indicates whether rebuilding of the block has been completed.

6. The method as recited in claim 5, comprising:
initiating a rebuild process;
determining which blocks of data are in the garbage collection process using the bitmap;
accessing the blocks of data that are not in the garbage collection process;
not accessing the blocks of data that are in the garbage collection process; and
performing the rebuild process using the blocks of data that are not in the garbage collection process,
wherein blocks indicated in the bitmap as not being in the garbage collection process and blocks indicated in the bitmap as not having been rebuilt are selected first for the rebuild process.

7. The method as recited in claim 6, comprising storing an indicator of the blocks not accessed, and later continuing the rebuild process using the blocks not accessed when said blocks are no longer in the garbage collection process.

8. The method as recited in claim 6, comprising reevaluating, after a predetermined period of time, the blocks that were determined to be in the garbage collection process to determine whether the garbage collection process is finished with the blocks not accessed; and later, in response to determining that the garbage collection process is finished with the blocks not accessed, continuing the rebuild process using the blocks not accessed when said blocks not accessed are no longer in the garbage collection process.

9. The method as recited in claim 6, wherein the rebuild is to a mirrored system, wherein the blocks of data that are not in the garbage collection process are synchronized between at least two controllers for rebuilding the data to the mirrored system.

10. The method as recited in claim 5, comprising updating, by the controller, the bitmap when additional blocks of data are selected for the garbage collection process;
and updating, by the controller, the bitmap when blocks of data are no longer in the garbage collection process.

11. The method as recited in claim 5, wherein the blocks indicated as not being in the garbage collection process and the blocks indicated as not having been rebuilt are selected first for a rebuild process.

12. A computer program product, the computer program product comprising a computer readable storage medium having program instructions embodied therewith, the program instructions readable and/or executable by a data processing apparatus to cause the data processing apparatus to perform a method comprising:
performing, by the data processing apparatus, a rebuild process using a bitmap indicating which blocks of data are not in a garbage collection process, wherein the blocks that are both: (a) indicated in the bitmap as not being in the garbage collection process and (b) indicated as not having been rebuilt, are selected first for the rebuild process;
determining which blocks of data are in the garbage collection process using the bitmap,
accessing the blocks of data that are not in the garbage collection process,
not accessing the blocks of data that are in the garbage collection process, and
performing the rebuild process using the blocks of data that are not in the garbage collection process.

13. The computer program product as recited in claim 12, wherein the program instructions are readable and/or executable by the data processing apparatus to cause the data processing apparatus to store an indicator of the blocks not accessed, and later continue the rebuild process using the blocks not accessed when said blocks are no longer in the garbage collection process.

14. The computer program product as recited in claim 12, wherein the program instructions are readable and/or executable by the data processing apparatus to cause the data processing apparatus to reevaluate, after a predetermined period of time, the blocks that were determined to be in the garbage collection process to determine whether the garbage collection process is finished with the blocks not accessed; and later, in response to determining that the garbage collection process is finished with the blocks not accessed, continue the rebuild process using the blocks not accessed when said blocks not accessed are no longer in the garbage collection process.

15. The computer program product as recited in claim 12, wherein the blocks of data that are not in the garbage collection process are synchronized between at least two controllers for rebuilding the data in parallel.

16. The computer program product as recited in claim 12, wherein the bitmap has a two bit structure for each of the blocks, wherein one bit indicates whether the block is in the garbage collection process, wherein the other bit indicates whether rebuilding of the block has been completed.

17. The computer program product as recited in claim 16, wherein the two bit structure includes a unique pair of bits associated with a logical block address (LB A) of the individual one of the blocks associated with the two bit structure.

* * * * *